Jan. 30, 1945.  M. J. SHOEMAKER  2,368,574
TREATMENT OF WATER
Filed Sept. 21, 1942
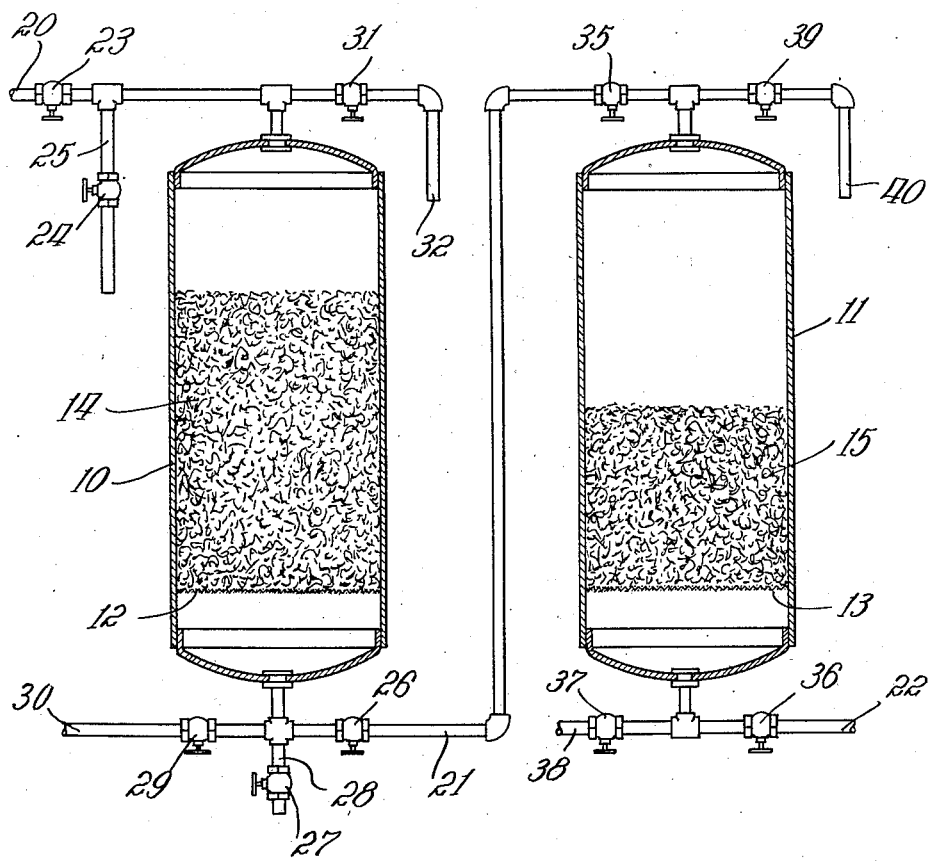
Inventor:
Milton J. Shoemaker
By:- Jesch and Darbo
Attys.

Patented Jan. 30, 1945

2,368,574

UNITED STATES PATENT OFFICE 2,368,574

TREATMENT OF WATER

Milton J. Shoemaker, Madison, Wis., assignor to Research Products Corporation, Madison, Wis., a corporation of Wisconsin Application September 21, 1942, Serial No. 459,081

7 Claims. (Cl. 210—24)

This invention relates to the treatment of water containing undesired alkalinity dissolved therein to reduce such alkalinity and produce a treated water having uniform reduced alkalinity. Particularly, the invention relates to an improved method and apparatus in which the raw water is passed in contact with a cation exchange material which is adapted to be charged with hydrogen ions and when so charged to replace with hydrogen the metal cations of the compounds which are in solution in the water, such exchange material being known as a hydrogen exchange material or a hydrogen zeolite. The invention achieves advantageous results which will be explained hereinafter.

Most of the natural waters which are used as sources of supply for municipal and industrial consumption contain dissolved therein substantial amounts of alkaline compounds, such as the bicarbonates of calcium, magnesium and sodium, and neutral compounds, such as the sulfates and chlorides of calcium and magnesium. The dissolved calcium and magnesium compounds impart hardness to the water. It has been known to treat such natural waters for the removal of dissolved alkalinity by passing them in contact with a hydrogen exchange material which has been charged with hydrogen ions. These are a number of well known hydrogen exchange materials which are commercially available, such as treated lignite, sulfonated coal and resins obtained by the condensation of a phenol with an aldehyde.

In treatments of this character, the exchange material is first charged with hydrogen ions by passing in contact with it a dilute solution of a regenerating acid, such as sulfuric acid or hydrochloric acid. The hydrogen ions of the acid replace the metal cations which may be present in the exchange material, with the result that the latter is charged with the hydrogen ions. In usual practice, a quantity of acid is used in excess of the amount theoretically required to charge the material with hydrogen ions. This excess of acid is then rinsed out of the material with water and the material is thereby placed in condition for use. The alkaline water to be treated is then passed in contact with the material and an exchange reaction takes place in which the metal ions of the dissolved compounds are replaced by the hydrogen ions of the exchange material. The carbonate compounds are converted into water and carbon dioxide. The carbon dioxide is relatively innocuous and may be allowed to remain in the water or may be eliminated by boiling, aeration, etc. The neutral salts, however, may be converted into the corresponding acids which impart a definite acidic character to the water. The extent to which this reaction occurs depends upon the character of the particular hydrogen exchange material employed and it increases as the amount of acid is increased with which the material is charged with hydrogen ions, and it decreases as the material progressively becomes more discharged in the treatment of the water. Such an acidic water is corrosive, and is objectionable for many purposes. For example, it is undesirable for use as boiler feed water because of its corrosive attack upon the boiler, and it is also undesirable for drinking water, for brewing, for making beverages and for other purposes.

The present invention provides a method in which such an acidic product is avoided, and a treated water is obtained which has a uniform reduced alkalinity which is so slight as to be unobjectionable.

In accordance with the invention, a quantity of the hydrogen exchange material is arranged in two beds, and both beds are initially charged with metal ions by passing raw water containing alkaline and neutral metal compounds dissolved therein in contact with both beds. After the material is charged with metal ions, a dilute aqueous solution of a regenerating acid is passed in contact with one of the beds whereby this bed is charged with hydrogen ions, after which the same bed is washed with water to free it of spent regenerating solution. Thereafter, the raw water to be treated is passed in contact with the entire quantity of the exchange material in a direction such that is contacts first the bed which is charged with hydrogen ions. In the first bed, the metal ions of the dissolved compounds are replaced by hydrogen with the result that the carbonates are converted into water and carbon dioxide, and the neutral salts, such as the chlorides and sulfates, are converted into the corresponding acids to a greater or lesser extent as explained heretofore. As the water continues through the second bed, it there encounters exchange material charged with metal ions. The carbon dioxide reacts feebly with the formation of a slight amount of metal bicarbonate, and the acids are converted into the corresponding salts of the metals. The final effluent water contains carbon dioxide and the neutral salts of metals, and is slightly alkaline to methyl orange indicator. It may contain, for example, approximately one grain per gallon of alkalinity, expressed as calcium carbonate. Passage of the raw water through the exchange material is continued until both beds are substantially completely charged with the metal ions, and the first bed is thereafter revivified by treatment with acid solution and rinsing, as described heretofore, and the cycle of operations is repeated. The second bed is not revivified or otherwise treated, and is subjected only to the passage of the raw water therethrough. The relative sizes of the first and second beds of the exchange material are caused to be such that upon exhaustion of the material after passage of raw water therethrough the material is substantially completely charged with the metal ions, except for a small portion thereof, as will be described hereinafter.

The drawing is a diagrammatic representation of an apparatus for carrying out the process.

The apparatus comprises two tanks 10 and 11 which are filled with hydrogen exchange material in a manner adapted for the percolation of water therethrough, such arrangement of exchange material being well known in the water treating art. Briefly, tanks 10 and 11 are provided with foraminous supporting plates or screens 12 and 13 upon which the beds of exchange material 14 and 15 are supported. Means are provided for passing the water to be treated through the beds in succession, the arrangement being such that it passes first in contact with bed 14 and thereafter in contact with bed 15. Means are also provided for periodically charging bed 14 with hydrogen ions. Such means will be described in connection with the description of the operation of the apparatus.

The operation is cyclic, and for purposes of description, the cycle will be described commencing with the passage of raw water through both beds until they are substantially completely charged with metal ions and are in the exhausted condition. For this operation raw water is introduced into the upper end of tank 10 by way of conduit 20 which is connected to a source of raw water under pressure. The water passes downwardly through exchange material 14 and out at the bottom of tank 10, thence through conduit 21, into the top of tank 11 and downwardly through the bed of material therein and thence into conduit 22 which leads to service.

After both beds are charged with metal ions, valve 23 in the raw water supply conduit 20 is closed and valve 24 in conduit 25 is opened. Conduit 25 leads to a source of supply of a dilute aqueous solution of a regenerating acid, such as sulfuric acid or hydrochloric acid. Simultaneously, valve 26 in the conduit 21 leading to the second tank 11 is closed and valve 27 in conduit 28 leading to waste is opened. During this operation, valve 29 in conduit 30 leading from the bottom of tank 10 to a source of raw water under pressure is maintained closed.

A flow of the dilute solution of regenerating acid takes place downwardly through the bed of exchange material 14, and the spent solution flows through conduit 28 to waste. After the metal ions contained by the bed have been substantially completely replaced by hydrogen ions, the flow of regenerating solution is discontinued by closing valve 24, and valve 23 is opened, admitting raw water into the top of the bed, thereby rinsing out the remainder of the spent regenerating solution which continues to flow to waste. After this rinsing operation has been completed, valve 27 in the conduit 28 leading to waste is closed and valve 26 in the conduit 21 leading to the second tank 11 is opened, whereby raw water flows through the two beds of exchange material in succession and the treated water flows to service by way of conduit 22.

When alkalinity appears in the treated water in an amount greater than is desired in the final treated water, passage of the water through the material is discontinued and the regenerating operation is again undertaken. The material in the first bed 14 may be backwashed prior to regeneration, by closing valves 23 and 26 and opening valve 29 in the raw water conduit 30 leading to the bottom of the tank 10 and valve 31 in conduit 32 leading from the top of tank 10 to waste. Water flows upwardly through the first bed 14 removing any sediment which may have collected upon the surface of the bed, and loosening the material for better percolation therethrough of the regenerating solution and water to be treated. The material is then regenerated by charging the first bed 14 with hydrogen ions in the manner described heretofore. Raw water is then passed through both beds and the series of operations is repeated cyclically. Bed 15 may also be backwashed periodically by closing valves 35 and 36 in conduits 21 and 22 and opening valve 37 in conduit 38 leading from the pressure water supply to the bottom of tank 11 and valve 39 in conduit 40 leading from the top of tank 11 to waste.

As has been explained above, in the first bed the carbonates are converted into water and innocuous carbon dioxide, and the non-carbonate salts into the corresponding acids. In the second bed, the carbon dioxide may react feebly with the formation of a slight amount of metal bicarbonate, and the acids are converted into neutral salts. The result is that an effluent is produced which is slightly alkaline to methyl orange indicator, as explained heretofore.

At the beginning of the treatment of raw water, the upper portion of the second bed 15 gives up its metal ions to the water coming from the first bed and becomes charged with hydrogen ions, and as operation continues, this zone of hydrogen ion charged materials expands progressively downward. After a time, the point is reached where the first bed 14 is substantially completely charged with metal ions and the water passing through it undergoes but little change. At this time, the upper portion of the second bed 15 begins to exchange its hydrogen ions for the metal ions of the water and to become charged with the metal ions, and as operation progresses this zone of metal ion charged material expands downwardly behind the advancing front of the downwardly expanding hydrogen ion charged zone. The result is that in practice, as the condition of exhaustion of the second bed 15 is approached, a zone is formed in the lower portion of the second bed in which the exchange material is charged with both metal ions and hydrogen ions.

An important advantage of the present invention is that the alkalinity of the treated water is automatically maintained at a uniform value. A uniform treated water is highly desirable, and heretofore has been obtained by passing the water through a bed of hydrogen-charged exchange material to produce a slightly acid water, and blending raw alkaline water therewith to produce a final water of the desired alkalinity. Since the acidity of the effluent varies as the exchange material becomes progressively more exhausted, the maintenance of a uniform product is difficult and requires frequent sampling and adjustment of the valve admitting raw water to the effluent of the hydrogen exchanger. The uniformity of the treated water in the present method is demonstrated by the following table showing the alkalinity of different specimens of the effluent as the run progressed. Tests were made simultaneously upon the effluent of both the first and the second bed. The effluent of the first bed is representative of ordinary operation in which a single bed is used. The negative alkalinity of this effluent indicates its acidic character, which persists throughout a large part of the run, and in general, the character of the effluent is less uniform than that of the second bed.

Table

| Gallons of water treated | Alkalinity of treated water (grains Ca(CO₃)₂ per gallon) | |
|---|---|---|
| | First bed | Second bed |
| 0 | −6.2 | |
| 550 | −2.2 | 1.4 |
| 2,000 | −.8 | 1.2 |
| 3,000 | −.6 | 1.4 |
| 4,150 | −.6 | 1.0 |
| 5,300 | −.5 | .8 |
| 7,150 | −.5 | .7 |
| 8,250 | −.5 | .65 |
| 9,400 | −.5 | .60 |
| 12,850 | .9 | .3 |
| 14,060 | 2.5 | .3 |
| 15,800 | 3.4 | .3 |
| 18,000 | 10.2 | 6.4 |

Another advantage of the present method is that high efficiency is obtained in the utilization of the capacity of the exchange material. It has been found that the exchange capacity is utilized to the best advantage when the ratio of the capacity of the exchange material which is not regenerated to that of the material which is regenerated is approximately the same as the ratio of the concentration of the neutral salts present in the raw water to the concentration of the alkaline compounds, both concentrations being expressed as gains of calcium carbonate per gallon. Since the capacities of the different portions are directly proportional to their quantities, the quantities of the two portions should bear this same relation. For example, if the raw water contains one part of neutral salts and ten parts of alkalinity, the quantity of exchange material in the second bed 15 should be approximately one-tenth that of the first bed 14. Other ratios than that described may be used with satisfactory results in reducing alkalinity, and a larger second bed may be employed if desired.

The relatively high efficiency of capacity utilization is best understood by comparing the results obtained by the present method with those of methods which have been proposed heretofore for reducing alkalinity. A specific installation using the present method of operation and employing a bed composed of 16 cubic feet of Alkalex, which is a commercially available hydrogen exchange material, and a second bed composed of 1½ cubic feet of the same material, the first bed being charged with hydrogen ions by treating it with an aqueous 1% solution of sulfuric acid, employing 2.4 pounds of 66° Bé. sulfuric acid (93.2% $H_2SO_4$) per cubic foot of material. The second bed was charged with calcium and magnesium ions by passing raw water through it. Raw water containing 17.5 grains per gallon (calculated as calcium carbonate) of alkalinity was passed through the first and second beds in succession, and an effluent water having a uniform average alkalinity of 1.0 grain per gallon was produced.

A capacity of 13,000 grains of calcium carbonate per cubic foot, based on the total amount of exchange material, was realized. In this operation, the following flow rates were used, expressed in gallons per minute per square foot of bed area: regeneration, 2 to 3 gallons; rinsing, 2 to 3 gallons; water treating, 1.0 gallon.

In a second method, following known practice and using the same flow rates, a single bed of the material was charged with acid and acidic effluent water was mixed with raw alkaline water in an amount sufficient to produce the desired alkalinity in the final treated product. In this method the same bed was employed as was used for the first bed in the previously described operation, namely a bed composed of 16 cubic feet of Alkalex, which had been charged with hydrogen ions in the same manner as described above, but employing 2 pounds of 66° Bé. sulfuric acid per cubic foot of material, because the use of larger amounts results in waste and inefficient use of acid. The normal effluent of the bed was acid in character and was blended with raw water in an amount sufficient to raise the alkalinity to 1.0 grain per gallon, the proportion of raw water being adjusted from time to time as the run progressed so as to maintain the alkalinity of the treated water substantially constant. In this method, a capacity of 10,470 grains of calcium carbonate per cubic foot of the exchange material was realized. The first method resulted in an increase of 24.2% in the effective capacity of the exchange material. In the first method the efficiency of acid utilization was 87% while in the second method it was 81.3%.

But one embodiment of the invention has been described and illustrated, and it is understood that various modifications may be made without departing from the spirit of the invention. For example, instead of arranging the two beds of exchange material in separate containers, they may be arranged in separate compartments of the same container.

I claim:

1. The method of reducing the alkalinity of raw water containing alkaline and neutral metal compounds dissolved therein, which comprises passing said raw water through a quantity of hydrogen exchange material until said exchange material is charged substantially with the metal ions of said dissolved compounds, thereafter passing in succession a dilute aqueous solution of a regenerating acid and rinse water in contact with a first portion of said exchange material to charge said first portion with hydrogen ions while diverting said regenerating solution and rinse water away from the remainder of said exchange material, and thereafter passing raw water in contact with said hydrogen charged portion and said metal charged portion in succession and in the order named.

2. The method of claim 1 in which the first and last portions of the exchange material contacted by the row water are arranged in separate beds.

3. The method of reducing the alkalinity of raw water containing alkaline and neutral metal compounds dissolved therein, which comprises passing said raw water through a quantity of hydrogen exchange material until said exchange material is charged substantially with the metal ions of said dissolved compounds, thereafter passing in succession a dilute aqueous solution of a regenerating acid and rinse water in contact with a first portion of said exchange material to charge said first portion with hydrogen ions while diverting said regenerating solution and rinse water away from the remainder of said exchange material, and thereafter passing raw water in contact with said hydrogen charged portion and said metal charged portion in succession and in the order named, the ratio of the quantities of exchange material in said regenerated and unregenerated portions being approximately proportional to the ratio of the concentration of the said alkaline metal compounds dissolved in said raw water to the concentration of the said neutral metal compounds dissolved in said raw water, expressed as grains of calcium carbonate per gallon.

4. The method of reducing the alkalinity of raw water containing alkaline and neutral metal compounds dissolved therein, which comprises passing raw water in contact with two beds of hydrogen exchange material whereby said beds become charged with the metal ions of said raw water, thereafter passing in succession a dilute aqueous solution of a regenerating acid and rinse water in contact with one of said beds to charge said bed with hydrogen ions, and thereafter passing raw water in contact with said hydrogen charged bed and said metal charged bed in succession and in the order named.

5. The method of reducing the alkalinity of raw water containing alkaline and neutral metal compounds dissolved therein, which comprises passing the raw water in contact with two beds of hydrogen exchange material in succession, the first of said beds having been regenerated by means of an acid and then rinsed with water and the second of said beds being charged with metal ions similar to the metal ions of said compounds dissolved in said raw water.

6. The method of reducing the alkalinity of raw water containing dissolved therein salts of alkaline earth metals which are alkaline to methyl orange, which consists in passing said water in contact with two beds of hydrogen exchange material in succession, the first of said beds being charged with hydrogen cations and the second of said beds being charged with alkaline earth metal cations, thereafter passing in contact with said first bed only, in succession, a dilute aqueous solution of regenerating acid and rinse water to charge said first bed with hydrogen ions, and thereafter passing said raw water in contact with said hydrogen charged bed and said alkaline earth metal charged bed in succession and in the order named.

7. The method of reducing the alkalinity of raw water containing dissolved therein salts of alkaline earth metals which are alkaline to methyl orange, which consists in passing said water in contact with two beds of hydrogen exchange material in succession, the first of said beds being charged with hydrogen ions and the second of said beds being charged with alkaline earth metal ions, thereafter passing in contact with said first bed only, in succession, a dilute aqueous solution of regenerating acid and rinse water to charge said first bed with hydrogen ions, and thereafter passing said raw water in contact with said hydrogen charged bed and said alkaline earth metal charged bed in succession and in the order named, and cyclically repeating said operations.

MILTON J. SHOEMAKER.